(12) United States Patent
Saini et al.

(10) Patent No.: US 12,149,936 B2
(45) Date of Patent: Nov. 19, 2024

(54) PRIVATE 5G FEDERATION SYSTEM FOR DYNAMIC USER EQUIPMENT ON-BOARDING

(71) Applicant: Cisco Technology, Inc., San Jose, CA (US)

(72) Inventors: Vinay Saini, Bangalore (IN); Snezana Mitrovic, Leefdaal (BE); Timothy P. Stammers, Raleigh, NC (US); Rajesh Indira Viswambharan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 17/848,879

(22) Filed: Jun. 24, 2022

(65) Prior Publication Data
US 2023/0422036 A1    Dec. 28, 2023

(51) Int. Cl.
*H04W 12/08*    (2021.01)
*H04W 12/06*    (2021.01)
*H04W 12/37*    (2021.01)

(52) U.S. Cl.
CPC ........... *H04W 12/08* (2013.01); *H04W 12/06* (2013.01); *H04W 12/37* (2021.01)

(58) Field of Classification Search
None
See application file for complete search history.

(56) References Cited

U.S. PATENT DOCUMENTS

| 2020/0374839 A1 | 11/2020 | Novlan et al. |
| 2021/0058784 A1 | 2/2021 | Kedalagudde et al. |
| 2022/0060893 A1 | 2/2022 | Gundavelli et al. |
| 2022/0070652 A1* | 3/2022 | Grayson ............... H04W 12/06 |
| 2023/0021642 A1* | 1/2023 | Grayson ............... H04W 8/12 |

(Continued)

FOREIGN PATENT DOCUMENTS

| EP | 3846545 A1 | 7/2021 |
| WO | 2021163870 | 8/2021 |
| WO | WO-2021260661 A1 * | 12/2021 ............. H04L 63/20 |

(Continued)

OTHER PUBLICATIONS

Zhao, Dongsheng et al. "Is 5G Handover Secure and Private? A Survey". IEEE Internet of Things Journal, vol. 8, No. 16. Aug. 15, 2021. pp. 12855-12879 (Year: 2021).*

(Continued)

*Primary Examiner* — Jeffrey R Swearingen
(74) *Attorney, Agent, or Firm* — Polsinelli P.C.

(57) ABSTRACT

Systems, methods, and computer-readable media are disclosed for dynamically onboarding a UE between private 5G networks. In one aspect, a private 5G (P5G) federation system can receive a request from a user device for registration with a serving private 5G network, which is part of a P5G federation system. The P5G federation system can further determine that the user device is authenticated with a home private 5G network of the user device, which is also part of the P5G federation system. The P5G federation system can transmit, to the serving private 5G network, a security profile of the user device that is received from the home private 5G network. As follows, the P5G federation system can facilitate onboarding of the user device to the serving private 5G network with the security profile.

20 Claims, 10 Drawing Sheets

(56) References Cited

U.S. PATENT DOCUMENTS

2023/0180009 A1* 6/2023 Balmakhtar .......... H04W 12/08
726/4

FOREIGN PATENT DOCUMENTS

WO     WO-2021260670 A1 * 12/2021    ........... H04W 12/02
WO     2022021155     2/2022

OTHER PUBLICATIONS

Huang, Jiaqi et al. "Secure and Efficient Privacy-Preserving Authentication Scheme for 5G Software Defined Vehicular Networks." IEEE Transactions on Vehicular Technology, vol. 69, No. 8. Aug. 2020. pp. 8542-8554. (Year: 2020).*

3GPP: "3rd Generation Partnership Project, Technical Specification Group Services and System Aspects, Study on Enhanced Support of Non-Public Networks (NPN) (Release 17)", 3GPP TR 23.700-07, 3GPP, Mobile Competence Centre, 650, Route Des Lucioles, F-06921 Sophia-Antipolis Cedex, France, vol. SA WG2, No. V17.0.0, Mar. 31, 2021, pp. 1-245, XP052000256, sect. 5.1, 5.4, 5.5, sect. 6.2, 6.4, 6.5, sect. 6.6, 6.27, 6.31, sect. 6.36, 6.37.

International Search Report and Written Opinion for International Application No. PCT/US2023/068575, mailed Oct. 2, 2023, 10 Pages.

* cited by examiner

PRIVATE 5G FEDERATION SYSTEM FOR DYNAMIC USER EQUIPMENT ON-BOARDING

TECHNICAL FIELD

The subject matter of this disclosure relates in general to the field of computer networking, and more particularly, to a private 5G federation system for dynamic onboarding of user equipment (UEs) between private networks.

BACKGROUND

Current mobile and wireless communication systems have widely adopted a next-generation wireless communication system, 5G that provides much higher data rates and lower latency. With the 5G evolution, a concept known as Private 5G (P5G) has been introduced. P5G uses 5G-enabled technologies (e.g., 3GPP access), but allows the owner to provide priority access or licensing for its wireless spectrum or dedicated bandwidth. As follows, an enterprise can be provided with an isolated 5G network, which can be dedicated to the enterprise for its specific use cases.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
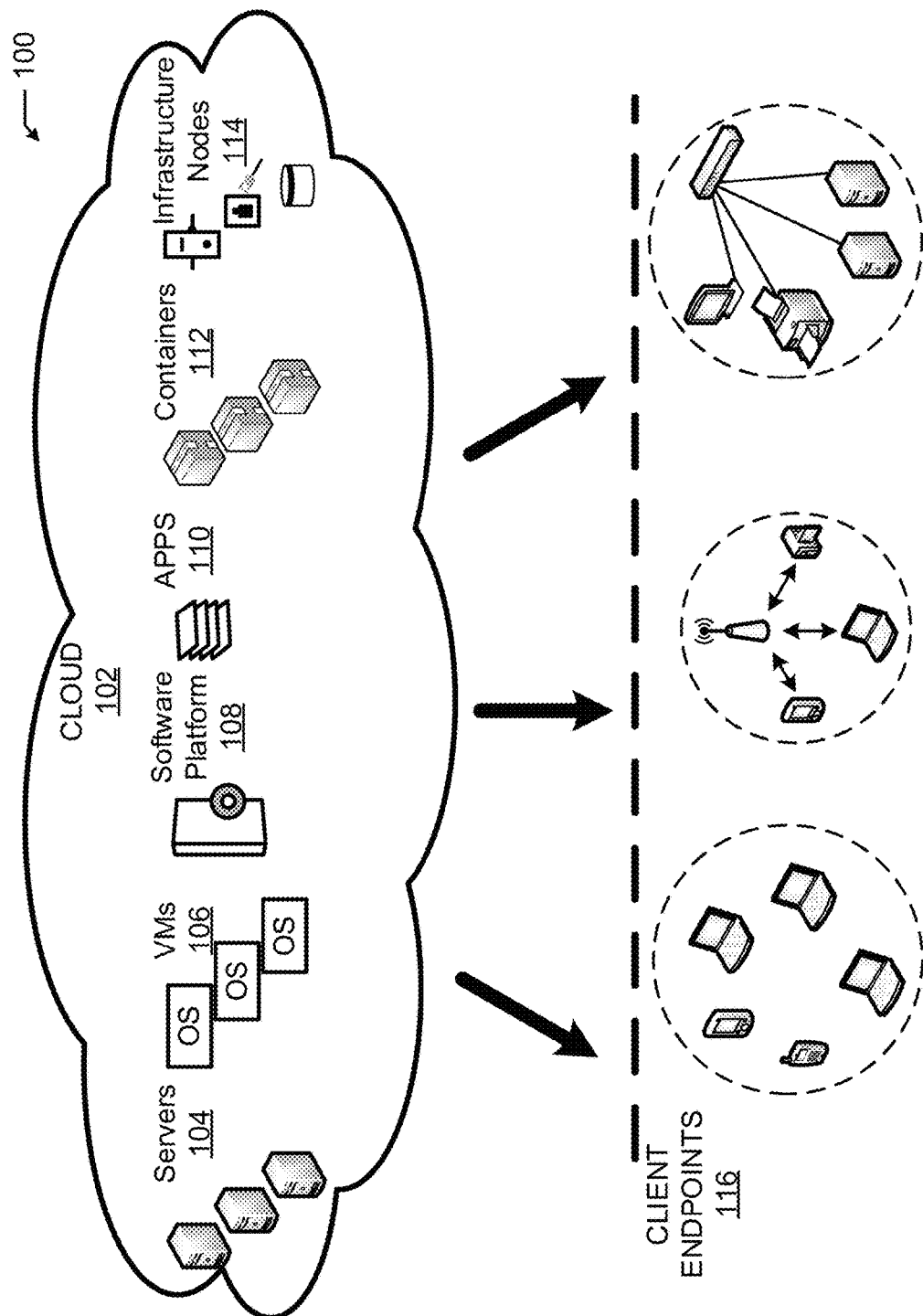
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable media for dynamically onboarding UE(s) between private 5G networks. More specifically, the present disclosure provides a mechanism that uses a federated system that allows Private 5G operators to share the device/user profile, provide authentication and share the device security score to enable serving standalone non-public network (SNPN) to apply dynamic policies, and on-board visiting UEs for different use-cases.

In one aspect, a method of dynamically onboarding a UE between private 5G networks includes receiving a request from a user device for registration with a serving private 5G network, wherein the serving private 5G network is part of a private 5G federation system and the request from the user device received upon broadcasting of a message by an access point of the serving private 5G network indicating that the serving private 5G network is part of the private 5G federation system; determining that the user device is authenticated with a home private 5G network of the user device, wherein the home private 5G network is part of the private 5G federation system. Further, the method includes in response to determining that the user device is authenticated with the home private 5G network, transmitting, to the serving private 5G network, a security profile of the user device that is received from the home private 5G network. As follows, the method includes facilitating onboarding of the user device to the serving private 5G network with the security profile.

In another aspect, the method of dynamically onboarding a UE between private 5G networks further includes comparing the security profile of the user device against minimum security requirements of the serving private 5G network prior to onboarding of the user device to the serving private 5G network.

In another aspect, the method of dynamically onboarding a UE between private 5G networks further includes determining a level of network accessibility of the user device based on the security profile, and transmitting the level of network accessibility to the serving private 5G network.

In another aspect, the method of dynamically onboarding a UE between private 5G networks further includes receiving, from the home private 5G network, performance records of the user device that are collected while the user device is connected to the home private 5G network and determining a trust score of the user device based on the security profile and the performance records to transmit to the serving private 5G network.

In another aspect, the method of dynamically onboarding a UE between private 5G networks further includes receiving, from the serving private 5G network, information associated with policy compliance of the user device within the serving private 5G network.

In another aspect, the message broadcasted is a System Information Block (SIB) message.

In another aspect, the security profile defines provisioning information and a security state of the user device.

In one aspect, a system for dynamically onboarding UEs with a private 5G network includes one or more computer-readable media comprising computer-readable instructions and one or more processors. The one or more processors are configured to execute the computer-readable instructions to receive a request from a user device for registration with a serving private network, wherein the serving private 5G network is part of a private 5G federation system and the request from the user device received upon broadcasting of a message by an access point of the serving private 5G network indicating that the serving private 5G network is part of the private federation system; determine that the user device is authenticated with a home private 5G network of the user device, wherein the home private 5G network is part of the private 5G federation system; in response to determining that the user device is authenticated with the home private 5G network, transmit, to the serving private 5G network, a security profile of the user device that is received from the home private 5G network; and facilitate onboarding of the user device to the serving private 5G network with the security profile.

In one aspect, one or more non-transitory computer-readable media include computer-readable instructions, which when executed by one or more processors, cause the processors to receive a request from a user device for registration with a serving private 5G network, wherein the serving private 5G network is part of a private 5G federation system and the request from the user device received upon broadcasting of a message by an access point of the serving private 5G network indicating that the serving private 5G network is part of the private 5G federation system; determine that the user device is authenticated with a home private 5G network of the user device, wherein the home private 5G network is part of the private 5G federation system; in response to determining that the user device is authenticated with the home private 5G network, transmit, to the serving private 5G network, a security profile of the user device that is received from the home private 5G network; and facilitate onboarding of the user device to the serving private 5G network with the security profile.

DESCRIPTION OF EXAMPLE EMBODIMENTS

The following acronyms are used throughout the present disclosure, provided below for convenience.
AAA: Authentication, Authorization, and Accounting
AMF: Access and Mobility Management Function
AUSF: Authentication Server Function
MUD: Manufacturer Usage Description
NF: Network Function
NG-RAN: Net Generation Radio Access Network
NSSAAF: Network Slice-Specific Authentication and Authorization Function
SIB: System Information Block
SIM: Subscriber Identity Module
SMF: Session Management Function
SNPN: Standalone Non-Public Network
SUCI: Subscription Concealed Identifier
SUPI: Subscription Permanent Identifier
UPF: User Plane Function As noted above, in private 5G, an enterprise can own a dedicated spectrum so that the private 5G network does not share traffic with other cellular networks in the vicinity. A private network, also known as non-public network (NPN), can be deployed as (1) SNPN (Stand Alone Private Network), which operates independently from Public Land Mobile Network (PLMN); and (2) PNI-NPN (Public Network Integrated Non-Public Network), which is deployed with the support of the PLMN. Also, SNPN can have two different sub-types: (1) ON-SNPN (Onboarding SNPN); and (2) SO-SNPN (Subscription Owned SNPN).

An existing process of onboarding a UE includes Universal Subscriber Identity Module (USIM) or embedded (soldered) Subscriber Identity Module (eSIM) provisioning to allow a subscriber to access a specific provider's network. However, under the existing process, onboarding and providing access to a third-party user can be tedious and require network admins to provision the user device. There is no mechanism to port the trust information from other SNPNs. There is no seamless mechanism to on-board devices from other Private 5G entities, other SNPNs or 3GPP access devices. There is no mechanism to authorize/'enable authorized UEs to be able to efficiently access and move between equivalent SNPNs. There is no mechanism to enable an authorized LE to be able to efficiently select equivalent SNPNs during network selection. Also, there is no mechanism to share security information related to a UE among SNPNs. As such, there exists a need for a mechanism that allows a UE to roam or join any of the private 5G networks within a private 5G federation system in a secure and seamless manner.

The present technology includes systems, methods, and computer-readable media for solving the foregoing problems and discrepancies, among others. As described in more detail below, the present disclosure provides systems, methods, and computer-readable media for dynamically onboarding UEs between private networks. More specifically, a private 5G federation system of the present technology can allow a private 5G operator to share a user profile and provide authentication of a user device to enable serving private network (e.g., SNPN) to apply dynamic policies and onboard the user device for various use cases.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
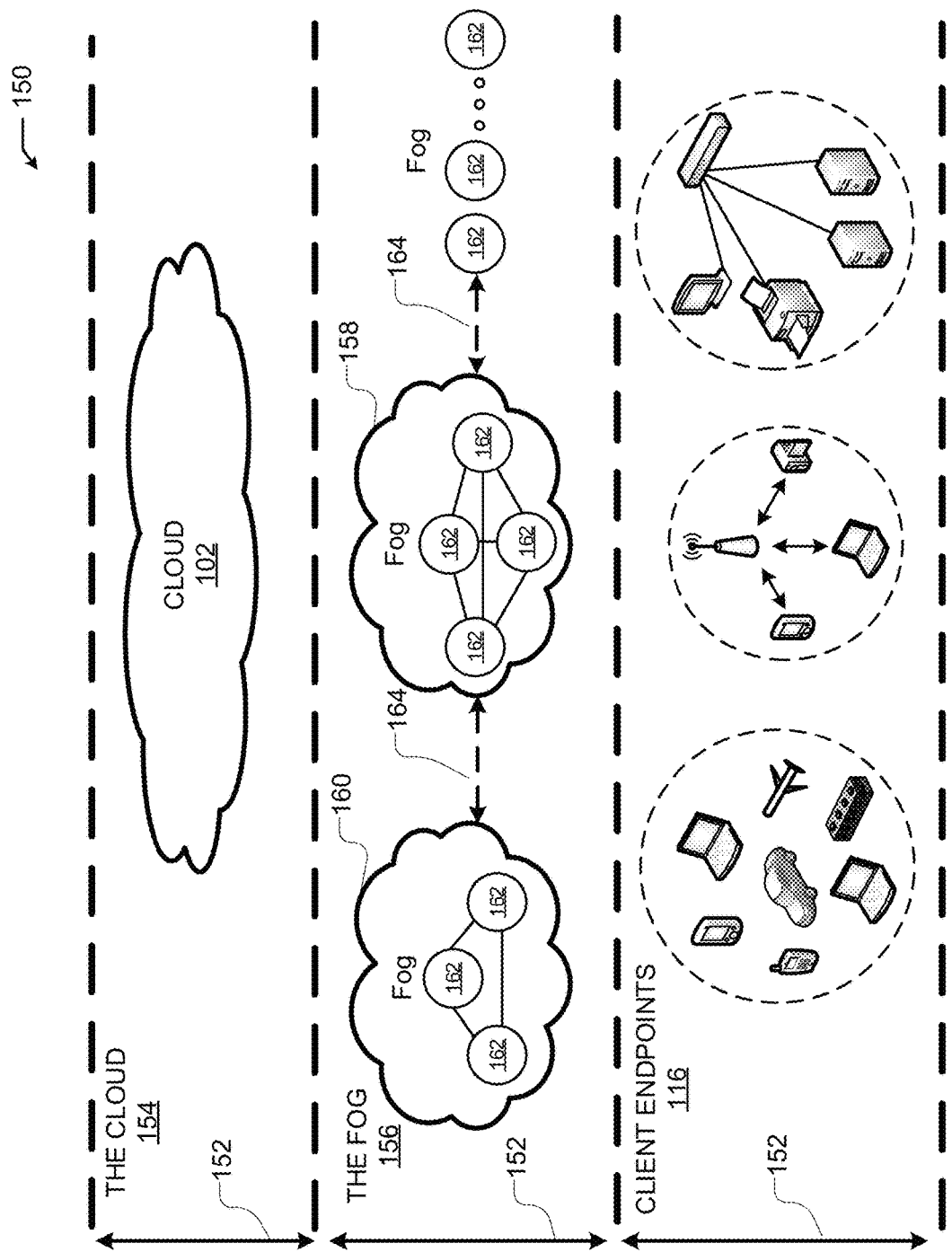
FIG. 1B illustrates an example fog computing architecture

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as a train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
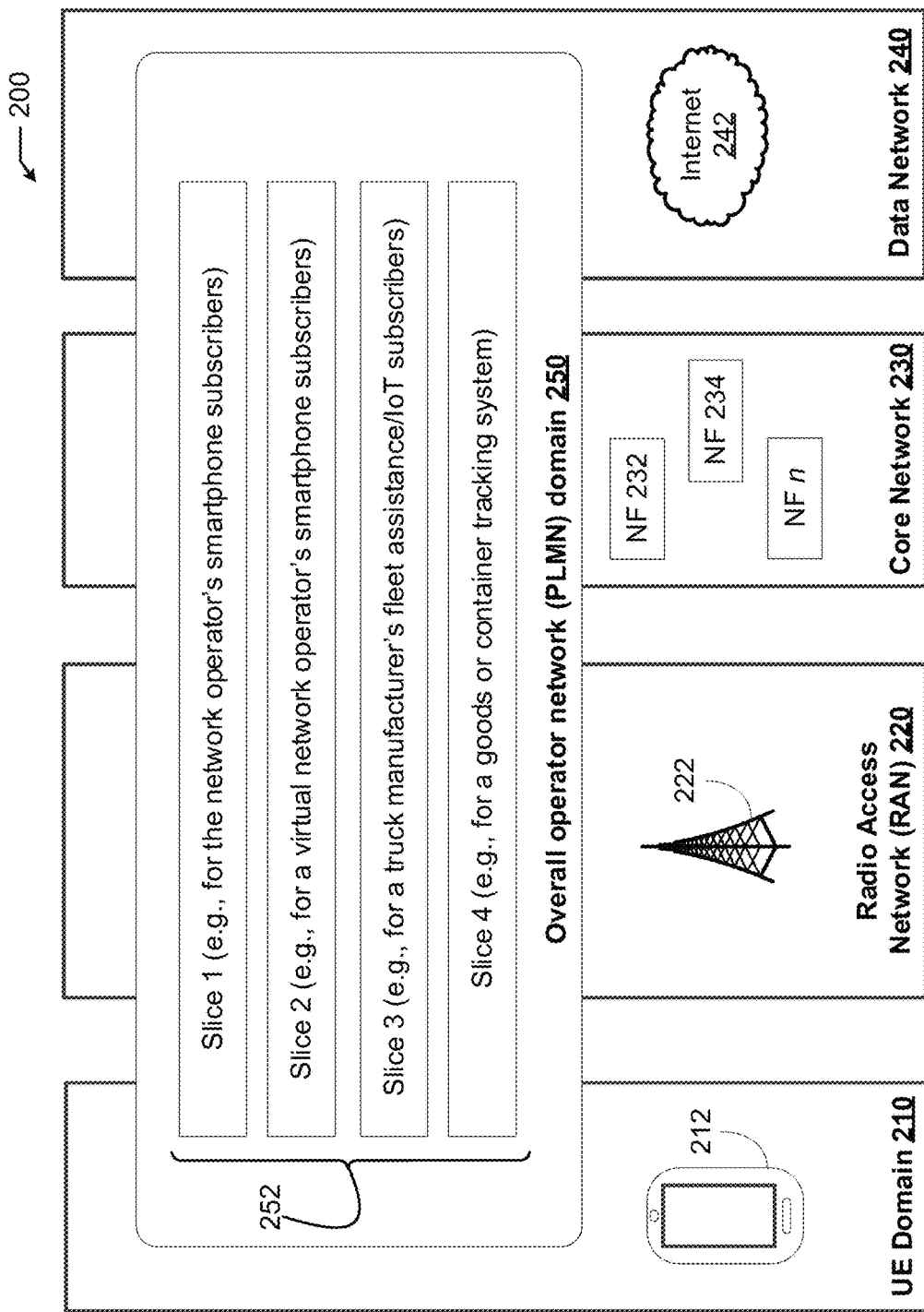
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPF s); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/

MME for characteristics of network slices, such as slice bandwidth, slice latency, processing power, and slice resiliency associated with the network slices. These network slice characteristics can be used in ensuring that assigned network slices are capable of actually provisioning specific services, e.g., based on requirements of the services, to the enterprise.

Figure 3:
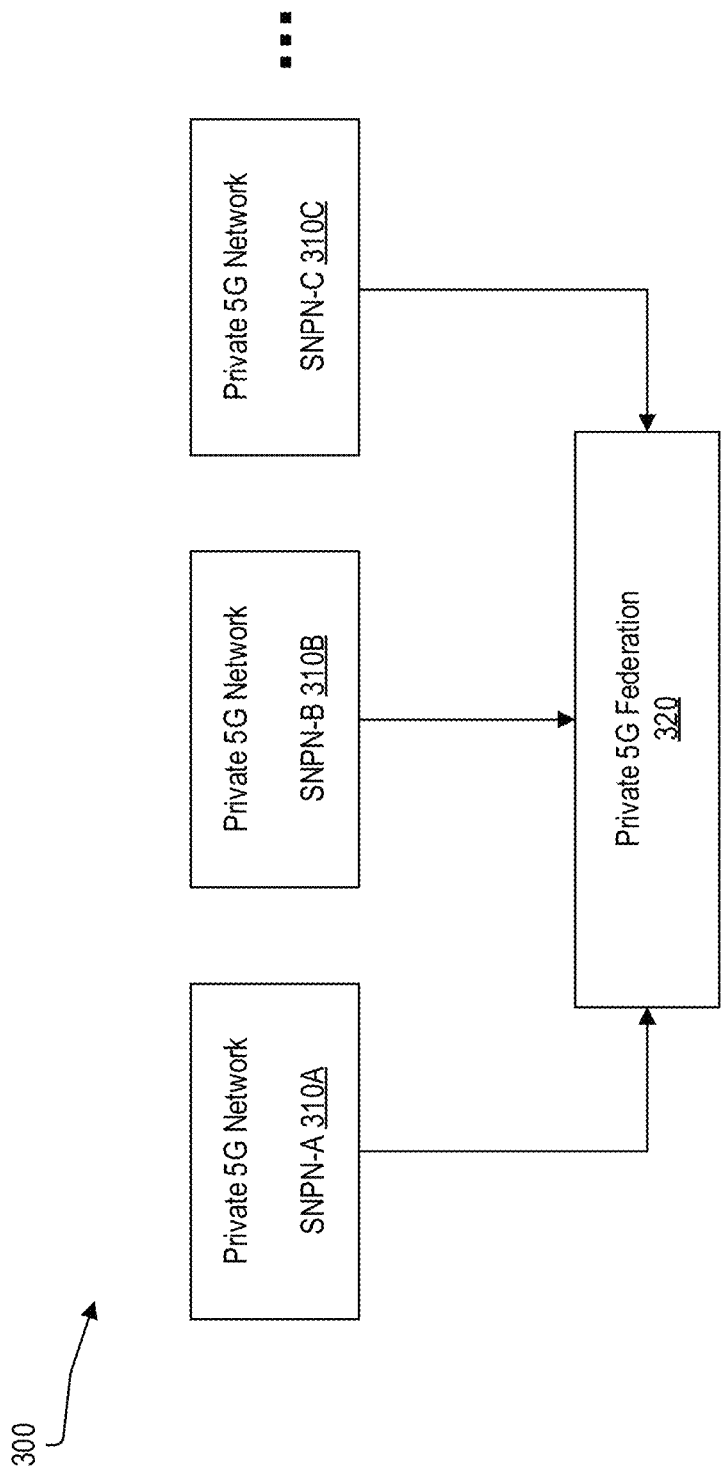
FIG. 3 illustrates an example private 5G federation system, according to some aspects of the present disclosure.

FIG. 3 illustrates an example private 5G federation system 300, according to some aspects of the present disclosure. Private 5G federation system 300 comprises SNPN-A 310A, SNPN-B 310B, and SNPN-C 310C (collectively, SNPNs 310). Each of SNPNs 310 can be a private 5G network and join private 5G federation 320. In some examples, private 5G federation can allow its member private 5G networks (e.g., SNPNs 310) to share network security functions and provide optional data/internet access for various use cases. While example private 5G federation system 300 comprises three private 5G networks, any applicable number of private networks can join private 5G federation 320.

Figure 4:
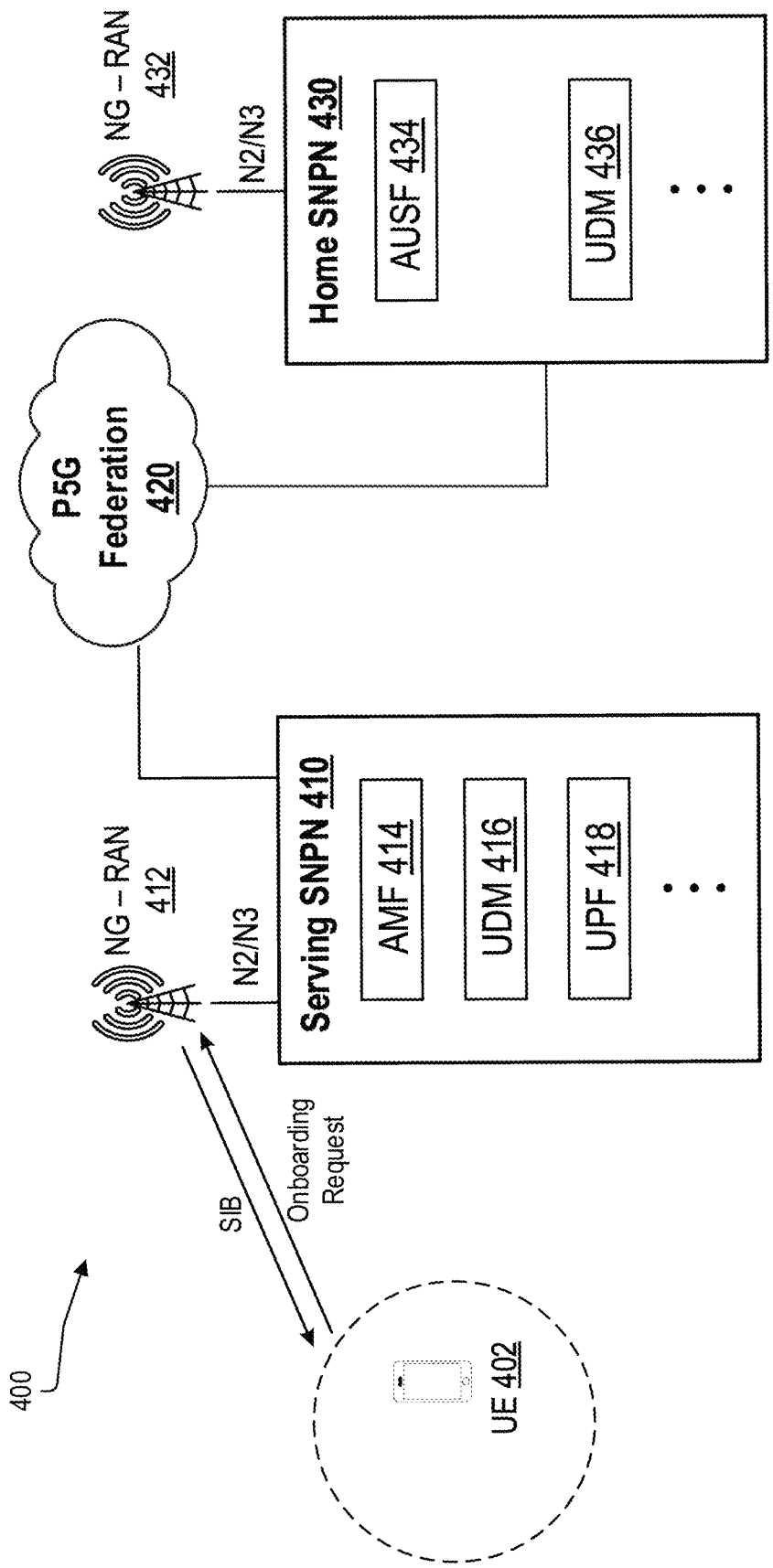
FIG. 4 illustrates an example network environment for a private 5G federation system, according to some aspects of the present disclosure.

FIG. 4 illustrates example network environment 400 for a private 5G federation system, according to some aspects of the present disclosure. Network environment 400 for a private 5G federation system comprises a non-limiting example UE 402, a non-limiting example serving (may also be referred to as visiting) SNPN 410 with NG-RAN 412, P5G federation 420, and a non-limiting example home SNPN 430 with NG-RAN 432. While FIG. 4 illustrates just one example UE 402, serving SNPN 410, and home SNPN 430, the present disclosure is not limiting thereto and network environment 400 can include any number of UEs and end terminals (connected devices), any number of serving SNPNs and any number of home SNPNs. Furthermore, while a limited number of network functions (NFs) and components are shown for each of serving SNPN 410 and home SNPN 430, each SNPN may include any other known or to be developed 5G NF and/or component. Lastly, each SNPN shown in FIG. 4 may have more than one NG-RAN associated therewith and not just one as shown in FIG. 4.

In some examples, UE 402 roams from home SNPN 430 to another network, serving SNPN 410. Both serving SNPN 410 and home SNPN 430 can be members of P5G federation 420. Serving SNPN 410 can comprise network functions such as AMF 414, UDM 416, and UPF 418. Home SNPN 430 can comprise network functions such as AUSF 434 and UDM 436.

Figure 5:
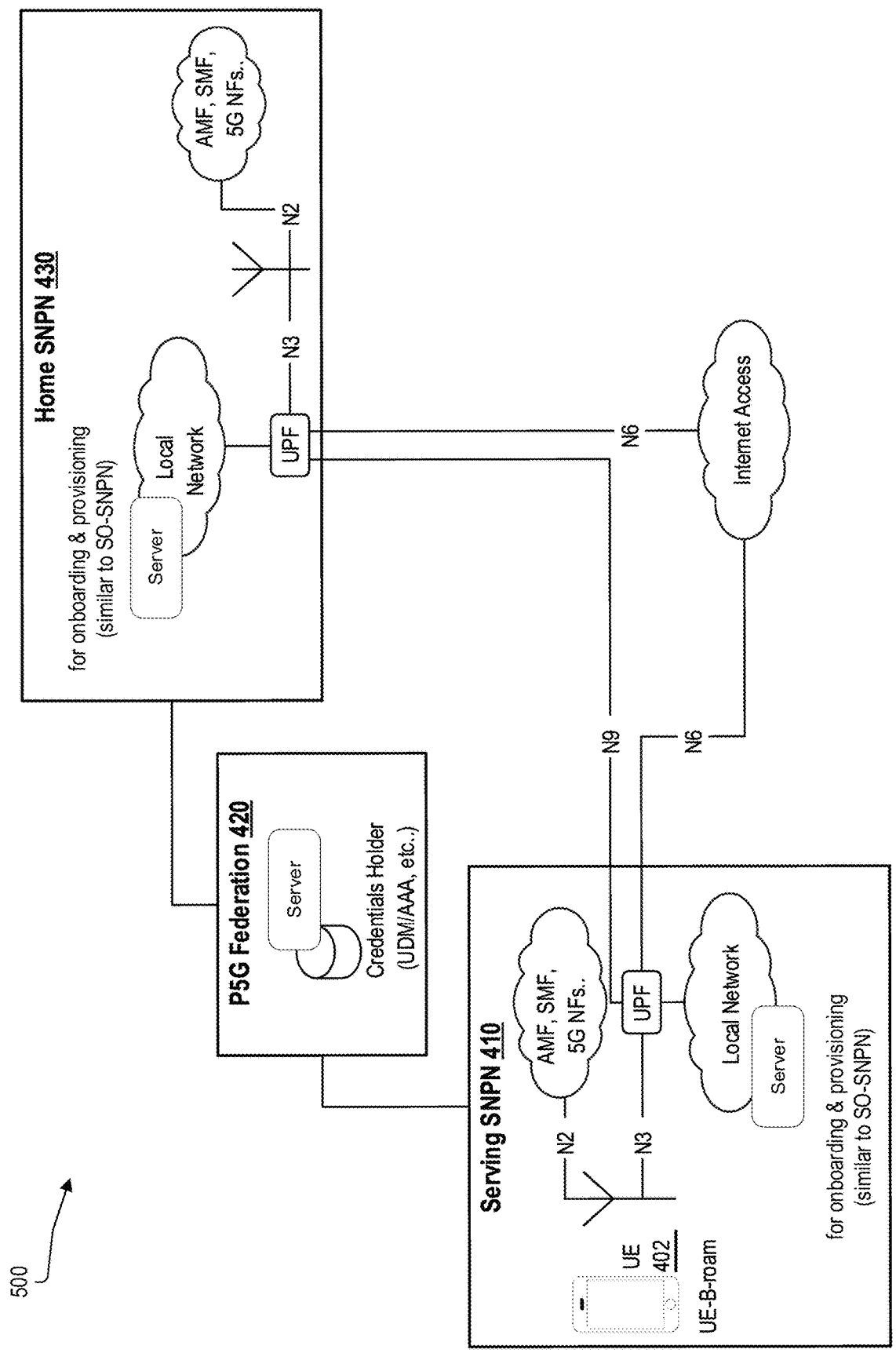
FIG. 5 illustrates another example network environment for a private 5G federation system, according to some aspects of the present disclosure.

FIG. 5 illustrates example network environment 500 for a private 5G federation system, according to some aspects of the present disclosure. Similar to network environment 400 as described in FIG. 4, network environment 500 for a private 5G federation system comprises UE 402, serving SNPN 410, P5G federation 420, and home SNPN 430. Similar to FIG. 4, while FIG. 5 illustrates just one example UE 402, serving SNPN 410, and home SNPN 430, the present disclosure is not limiting thereto and network environment 500 can include any number of UEs and end terminals (connected devices), any number of serving SNPNs and any number of home SNPNs. Furthermore, while a limited number of network functions (NFs) and components are shown for each of serving SNPN 410 and home SNPN 430, each SNPN may include any other known or to be developed 5G NF and/or component. Lastly, each SNPN shown in FIG. 4 may have more than one NG-RAN associated therewith and not just one as shown in FIG. 4.

According to some implementations, SNPN 410 or 430 can assume the role of a SO-SNPN when needed. More specifically, a member of P5G federation 420 (e.g., serving SNPN 410 and home SNPN 430) can provide authentication and provisioning service for UE 402. In some examples, P5G federation 420 can assume the role of the authentication and provisioning service for UE 402 that joins a member private network of P5G federation 420. Also, P5G federation 420 can utilize any applicable existing procedures defined by 3GPP for OB-SNPN, but it is not limited to pre-existing partnerships or agreements.

In some examples, UE 402 roams from home SNPN 430 to another network, serving SNPN 410, where both serving SNPN 410 and home SNPN 430 are members of federated 5GP 420. Members of federated 5GP 420 (e.g., serving SNPN 410 and home SNPN 430) can broadcast technology-specific beacons (e.g., cellular or Wi-Fi), which provide information about the support for onboarding UEs so that members can share the onboarding support information with each other within P5G federation 420. As follows, in some instances, P5G federation 420 can play a role as a credentials holder that keeps onboarding support information of its members.

In some aspects, when UE 402 tries to connect to a private 5G network with Wi-Fi, an Access Network Query Protocol (ANQP)-based mechanism can be used for onboarding UE 402 using Wi-Fi.

In some examples, NG-RAN of SNPN (e.g., NR-RAN 412 of serving SNPN 410 and NG-RAN 432 of home SNPN 430 as illustrated in FIG. 4) can broadcast support for other members of P5G federation 420 by utilizing a System Information Block (SIB) message.

In some instances, when UE 402 enters a region that is covered by P5G federation 420. An onboarding process of UE 402 can be followed by a network selection procedure as defined in 3GPP 23.501 (Section 5.30.2.10.2.5). When P5G federation 420 determines that UE 402 has partner SNPN credentials from home SNPN 430 (i.e., default credentials) and tries to join serving SNPN 410, P5G federation 420 can send the credentials of home SNPN 430 to serving SNPN 410. In some examples, along with the credentials, P5G federation 420 can include additional parameters such as the user device profile and the security state of the user device. A registration of UE onboarding can be performed as defined in 3GPP standards (e.g., Section 5.30.2.10.2.6 of 23.501).

Figure 6:
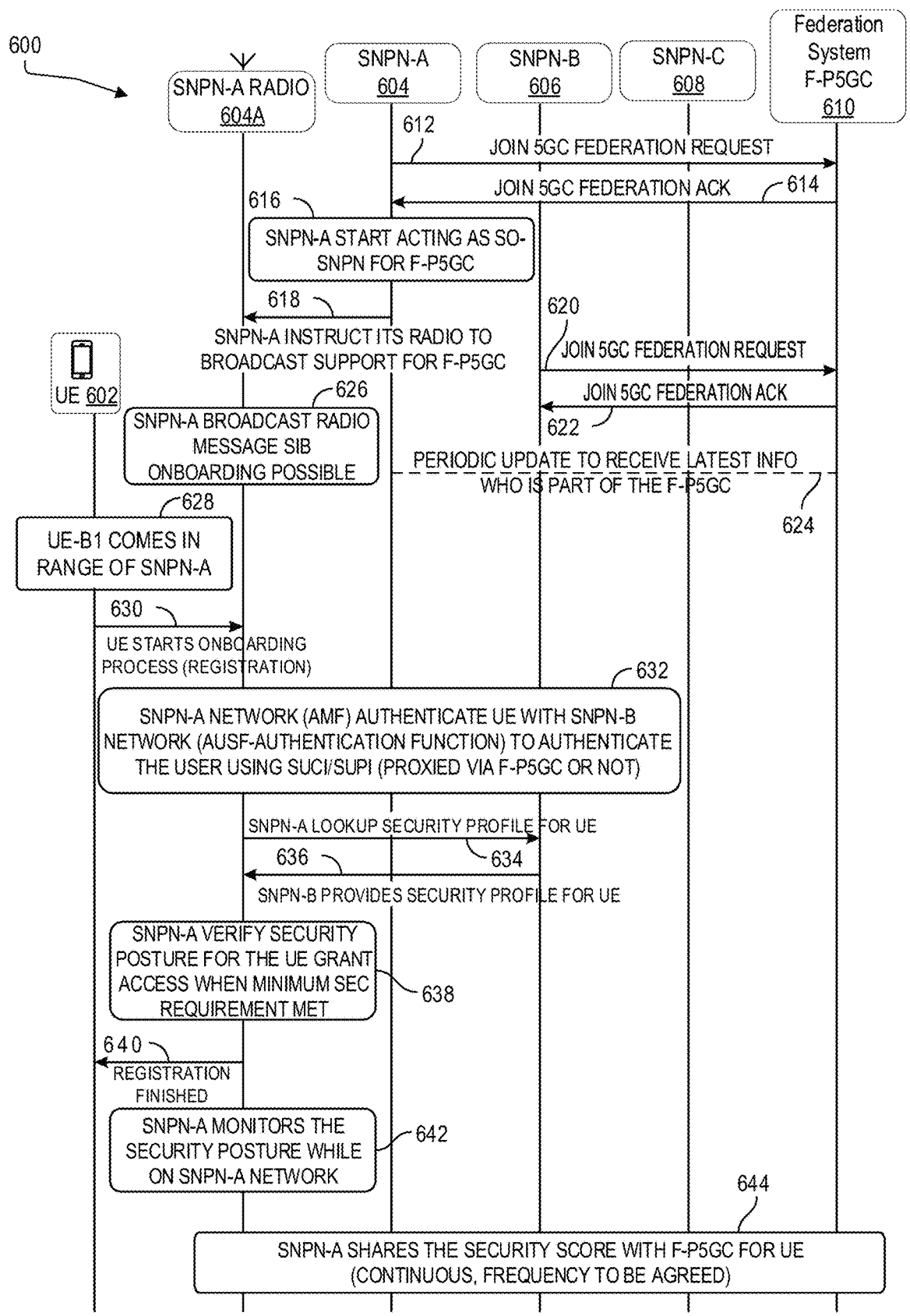
FIG. 6 illustrates an example flow for dynamically onboarding a user device between private networks of a private 5G federation system, according to some aspects of the present disclosure.

FIG. 6 illustrates an example flow 600 for dynamically onboarding a user device between private networks of a private 5G federation system, according to some aspects of the present disclosure. Network environment for example flow 600 comprises UE 602, federation system (F-P5GC) 610, and members of federation system 610 including SNPN-A 604 with SNPN-A radio 604A, SNPN-B 606, and SNPN-C 608.

At step 612, SNPN-A 604 can send a request to join 5GC federation to federation system 610. As follows, federation system 610 can send an acknowledgment message to SNPN-A 604 at step 614. Then, SNPN-A 604 can start acting as SO-SNPN for federation system 610 at step 616.

At step 618, SNPN-A 604 can instruct its NR-RAN (i.e., SNPN-A radio 604A) to broadcast support for federation system 610 to other members of federation system 610. Other private networks such as SNPN-B 606 and SNPN-C 608 can join federation system 610 in a similar manner as shown in steps 620 and 622. Each member of federation system 610 (e.g., SNPN-A 604, SNPN-B 606, and SNPN-C 608) can periodically receive an update on members of federation system 610 at step 624.

Upon joining federation system 610, SNPN-A 604 can broadcast a radio message (e.g., a SIB message) to inform other networks that onboarding is available at step 626. For example, the radio message can indicate that if a UE is from a network that is part of federation system 610, the UE can onboard SNPN-A 604.

At step 628, UE 602 enters a P5G federation coverage zone, which is in the range of SNPN-A 604. In other words, at step 628, UE 602 may enter a zone with cellular coverage provided by any of the federation members (e.g., SNPN-A 604). As follows, UE 602 starts the onboarding process (i.e., registration) at step 630. At step 632, a network element of SNPN-A 604 (e.g., AMF 414 as illustrated in FIGS. 2 and 4) can authenticate UE 602 with a network element of SNPN-B 606 (e.g., AUSF 434 as illustrated in FIGS. 2 and 4) based on SUCI/SUPI of UE 602, which can be proxied via federation system 610 or not.

Once UE 602 is authenticated, SNPN-A radio 604A can request a security profile of UE 602 from SNPN-B 606 via federation system 610 at step 634. As follows, SNPN-B 606 can provide the security profile of UE 602 to SNPN-A radio 604A via federation system 610 at step 636. In some implementations, the security profile of UE 602 can be provided by federation system 610 to a private network that requested.

At step 638, SNPN-A 604 can verify security posture for UE 602 and grant access when minimum security requirement is met. Once the access is granted, the registration of UE 602 with SNPN-A 604 is finished at step 640. While UE 602 is connected to SNPN-A 604, SNPN-A 604 monitors the security posture at step 642. As follows, SNPN-A 604 can share the security score of UE 602 with federation system 610 at step 644. Such security score may be utilized for improving security and quality of services provided by 5G federation system to end terminals and UEs. In another example, a security score may be used to set network and access policies for different UEs and/or different members of 5G federation system when given access on different visiting networks.

Figure 7:
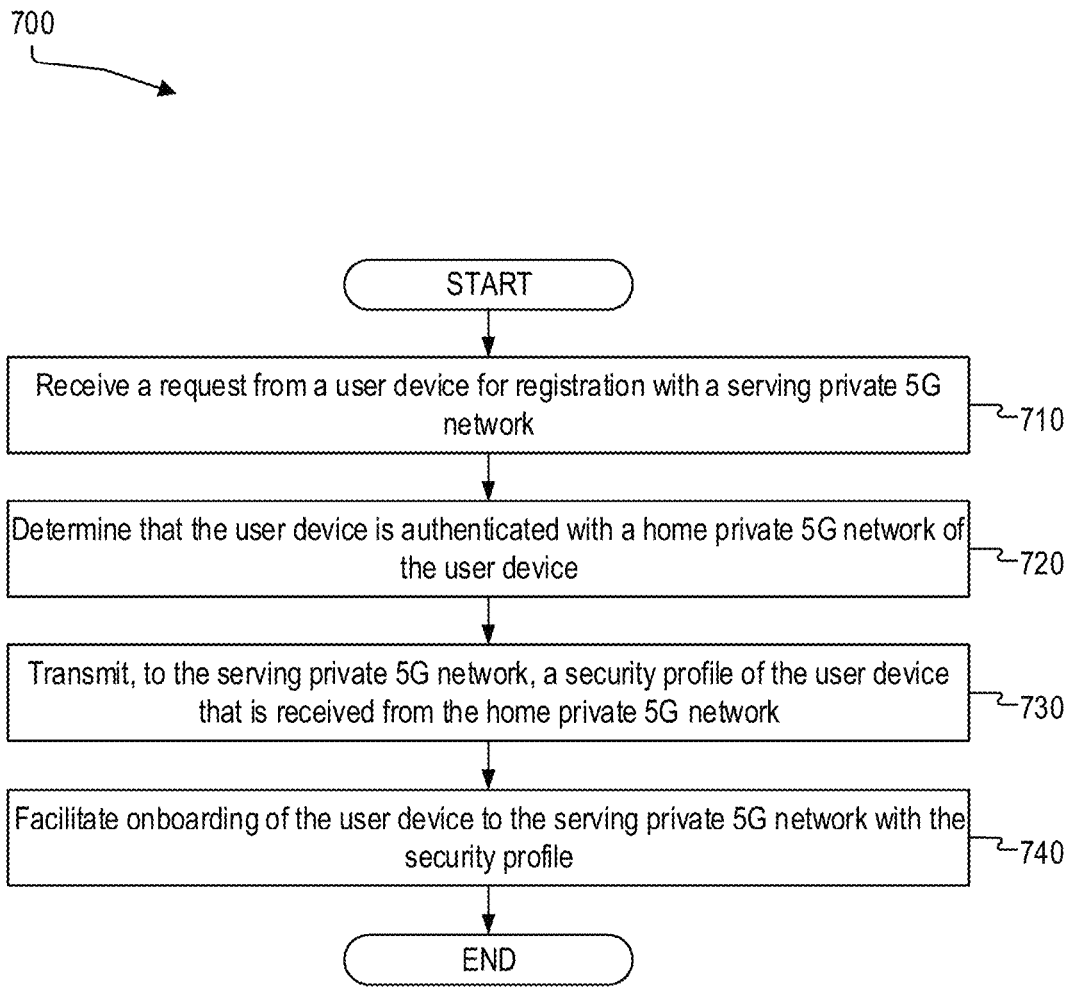
FIG. 7 illustrates a flow chart of an example method of dynamically onboarding a user device between private networks, according to some aspects of the present disclosure.

FIG. 7 illustrates a flow chart of an example method 700 of dynamically onboarding a user device between private networks, according to some aspects of the present disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence. In one non-limiting example, process of FIG. 7 may be performed by one or more components (e.g., a processing component or controller) of P5G federation 420. It should be noted that such component (or more generally P5G federation 420) may have one or more associated memories having computer-readable instructions stored therein, which when executed by one or more processors, cause P5G federation 420 to perform the steps of FIG. 7 described below.

At step 710, method 700 includes receiving a request from a user device for registration with a serving private 5G network. In some examples, the serving private 5G network is part of a private 5G federation system. For example, a federation system (e.g., private 5G federation 320 as illustrated in FIG. 3, P5G federation 420 as illustrated in FIGS. 4 and 5, or federation system 610 as illustrated in FIG. 6) can receive a request from a user device (e.g., UE 402 as illustrated in FIGS. 4 and 5 or UE 602 as illustrated in FIG. 6) for registration with a serving private 5G network (e.g., serving SNPN 410 as illustrated in FIGS. 4 and 5 or SNPN-A 604 as illustrated in FIG. 6) where the serving private 5G network is part of the federation system. In some examples, when a user device enters a region that is covered by a federation system (or a 5G network that is a member of a federation system), the federation system can identify a private network of the region and facilitate the onboarding of the user device with the private network.

At step 720, method 700 includes determining that the user device is authenticated with a home private 5G network of the user device. In some examples, the home private 5G network is part of the private 5G federation system. For example, a federation system (e.g., private 5G federation 320 as illustrated in FIG. 3, P5G federation 420 as illustrated in FIGS. 4 and 5, or federation system 610 as illustrated in FIG. 6) can determine that the user device (e.g., UE 402 as illustrated in FIGS. 4 and 5 or UE 602 as illustrated in FIG. 6) is authenticated with a home private 5G network (e.g., home SNPN 430 as illustrated in FIGS. 4 and 5 or SNPN-B 606 as illustrated in FIG. 6) where the home private 5G network is part of the federation system.

In some examples, a user device can be authenticated based on a communication between a network element (e.g., AMF 414 as illustrated in FIG. 4) of the serving SNPN and a network element (e.g., AUSF 434 as illustrated in FIG. 4) of the home SNPN.

At step 730, method 700 includes transmitting, to the serving private 5G network, a security profile of the user device that is received from the home private 5G network in response to determining that the user device is authenticated with the home private 5G network. For example, a federation system (e.g., private 5G federation 320 as illustrated in FIG. 3, P5G federation 420 as illustrated in FIGS. 4 and 5, or federation system 610 as illustrated in FIG. 6) can transmit, to the serving private 5G network (e.g., serving SNPN 410 as illustrated in FIGS. 4 and 5 or SNPN-A 604 as illustrated in FIG. 6), a security profile of the user device (e.g., UE 402 as illustrated in FIGS. 4 and 5 or UE 602 as illustrated in FIG. 6) that is received from the home private 5G network (e.g., home SNPN 430 as illustrated in FIGS. 4 and 5 or SNPN-B 606 as illustrated in FIG. 6). The security profile of the user device can be provided by any applicable device profiling system available (e.g., MUD for an IoT-specific user device).

In some instances, the security profile can include a device/user profile, for example, indicating whether the user device is a standard 5G mobile device, an IoT machine, or a networking device.

In some examples, the security profile can define provisioning information, which may be used for onboarding the user device and the registration of the device with the serving SNPN and a security state of the user device. The security state of the user device, for example, can indicate whether the user device is infected with any virus, which may infect the serving network system.

Further, a federation system can, along with the security profile of the user device, include additional parameters to be provided to the serving SNPN. Examples of the additional parameters can include, but are not limited to, a trust score of the user device, a record of any deviation in behavior exhibited by the user device while connected to the home private network, and a device access level.

For example, a federation system can determine the level of network accessibility of the user device based on the security profile. The federation system can further transmit the level of network accessibility to the serving private 5G network. In some instances, the level of network accessibility can be defined as, but is not limited to: (1) a trusted device with local network access only; (2) a trusted device with local and internet access; (3) a trusted device with limited internet access; and (4) a device that meets minimum security requirements as agreed by the federation system for different device types.

In some examples, method 700 includes determining a trust score of a user device, for example, based on the security profile of the user device and performance records of the user device that are collected while the user device is connected to the home network (e.g., information associated with policy compliance of the user device). A federation system (e.g., private 5G federation 320 as illustrated in FIG. 3, P5G federation 420 as illustrated in FIGS. 4 and 5, or federation system 610 as illustrated in FIG. 6) can assign a trust score of a user device based on any information associated with the user device that is received from the home network and any other member network of the federation system or is available with the federation system. Such information can include a security profile of the user device, historical records regarding policy compliance or deviation in the behavior of the user device, a security state of the user device, etc.

In some instances, method 700 further includes transmitting the trust score of the user device to the serving network. The trust score can be used to determine if the user device meets the minimum security requirements of the serving network (e.g., serving SNPN 410 as illustrated in FIGS. 4 and 5 or SNPN-A 604 as illustrated in FIG. 6) before local network access is granted, as described in details below. The trust score does not store any Personally Identifiable Information (PII).

Further, in some instances, based on the above-described information associated with the user device, a serving SNPN can create a local policy. For example, a serving SNPN (e.g., serving SNPN 410 as illustrated in FIGS. 4 and 5 or SNPN-A 604 as illustrated in FIG. 6) can publish an updated policy based on UE provisioning information, a home private network policy, a local network policy (i.e., pre-provisioned policies hosted on an access control policy platform for Wi-Fi users). In some instances, an enterprise policy (e.g., an access control policy) can be updated to include data associated with a home private network (e.g., home SNPN 430 as illustrated in FIGS. 4 and 5 or SNPN-B 606 as illustrated in FIG. 6). Then, the newly updated enterprise policy can be applied to an endpoint to indicate whether Wi-Fi, cellular SNPN, or cable access is used.

According to some implementations, method 700 includes, prior to onboarding of the user device to the serving private 5G network, comparing the security profile of the user device against minimum security requirements of the serving private 5G network. For example, a federation system (e.g., private 5G federation 320 as illustrated in FIG. 3, P5G federation 420 as illustrated in FIGS. 4 and 5, or federation system 610 as illustrated in FIG. 6) can compare the security profile of the user device (e.g., UE 402 as illustrated in FIGS. 4 and 5 or UE 602 as illustrated in FIG. 6) against minimum security requirements of the serving private 5G network (e.g., serving SNPN 410 as illustrated in FIGS. 4 and 5 or SNPN-A 604 as illustrated in FIG. 6) to confirm, prior to onboarding of the user device to the serving private 5G network, that it is safe to onboard the user device.

At step 740, method 700 includes facilitating onboarding of the user device to the serving private 5G network with the security profile. For example, a federation system (e.g., private 5G federation 320 as illustrated in FIG. 3, P5G federation 420 as illustrated in FIGS. 4 and 5, or federation system 610 as illustrated in FIG. 6) can facilitate the onboarding of the user device (e.g., UE 402 as illustrated in FIGS. 4 and 5 or UE 602 as illustrated in FIG. 6) with the serving network (e.g., serving SNPN 410 as illustrated in FIGS. 4 and 5 or SNPN-A 604 as illustrated in FIG. 6) with the security profile of the user device (aka default credentials of the user device that have been used with its home network).

According to some implementations, method 700 includes receiving, from the serving private 5G network, information associated with policy compliance of the user device within the serving private 5G network. For example, a federation system (e.g., private 5G federation 320 as illustrated in FIG. 3, P5G federation 420 as illustrated in FIGS. 4 and 5, or federation system 610 as illustrated in FIG. 6) receives information about the user device's compliance with the policy of the serving network. The user device can be tracked, while on the serving network, for policy compliance and any deviations, which can then be reported to the federation system.

In some examples, method 700 further includes facilitating an exchange of network accessibility information between a plurality of private 5G networks that are part of the private 5G federation system. For example, a federation system (e.g., private 5G federation 320 as illustrated in FIG. 3, P5G federation 420 as illustrated in FIGS. 4 and 5, or federation system 610 as illustrated in FIG. 6) can facilitate an exchange of network accessibility information between its member networks such as SNPNs 310 as illustrated in FIG. 3 or SNPN-A 604, SNPN-B 606, and SNPN-C 608 as illustrated in FIG. 6). Each member network can, when it joins the federation system, broadcast a radio message (e.g., a SIB message) to let other members know of its support for the federation system.

Figure 8:
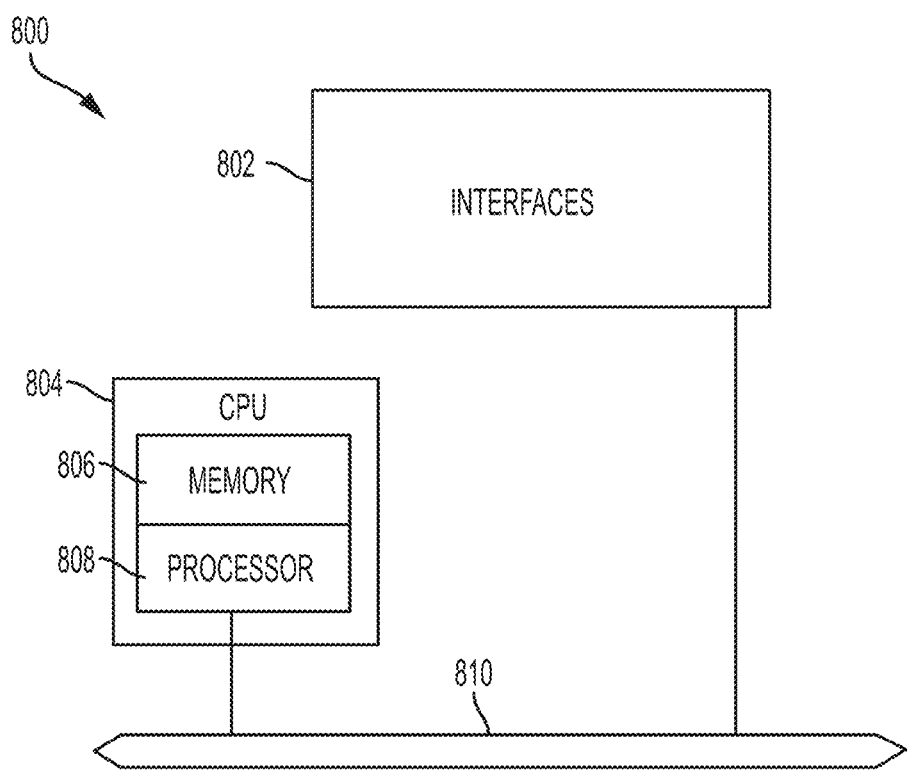
FIG. 8 illustrates an example network device, according to some aspects of the present disclosure.

FIG. 8 illustrates an example network device 800 suitable for performing switching, routing, load balancing, and other networking operations, according to some aspects of the present disclosure. Example network device 800 may be used any one of the network components described above with reference to FIGS. 1-7 including, but not limited to, UEs such as UE 402, different SNPNs of 5G federation system, federation system F-P5GC 610, etc. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

Figure 9:
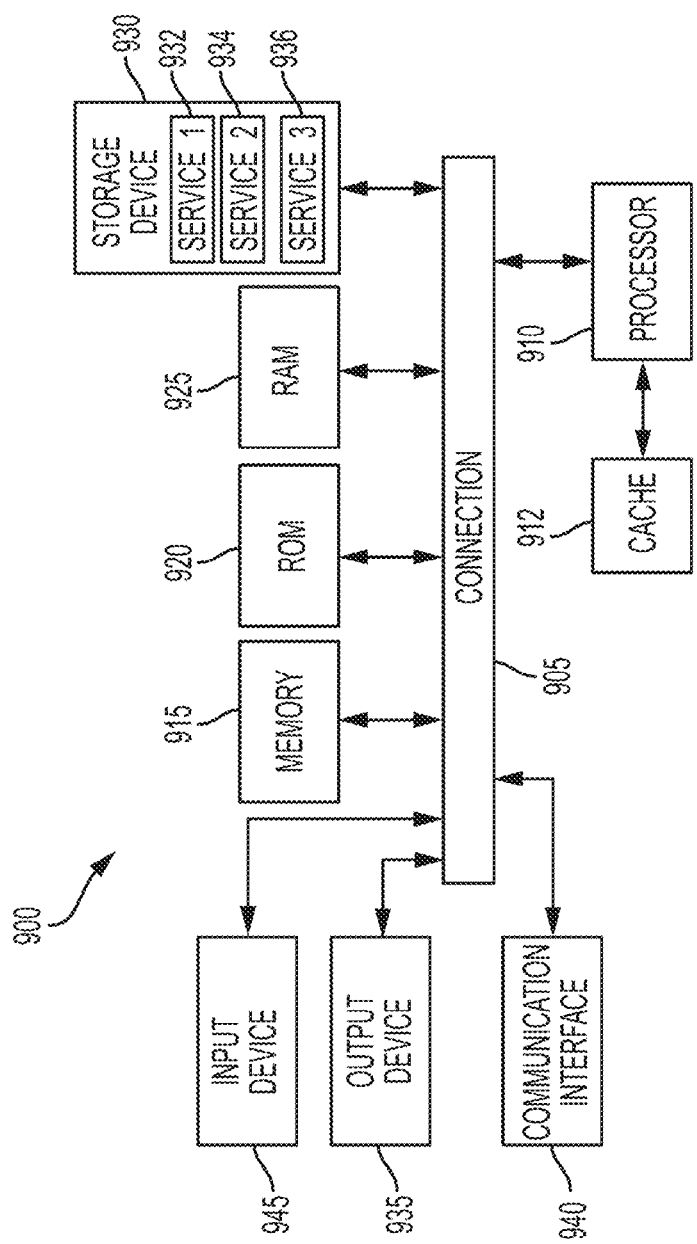
FIG. 9 shows an example computing system, which can be for example any computing device that can implement components of the system.

FIG. 9 illustrates an example computing system 900 including components in electrical communication with each other using a connection 905 upon which one or more aspects of the present disclosure can be implemented. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900.

Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving a request from a user device for registration with a serving private 5G network, wherein the serving private 5G network is part of a private 5G federation system and the request from the user device received upon broadcasting of a message by an access point of the serving private 5G network indicating that the serving private 5G network is part of the private 5G federation system;
   determining that the user device is authenticated with a home private 5G network of the user device, wherein the home private 5G network is part of the private 5G federation system;
   in response to determining that the user device is authenticated with the home private 5G network, transmitting, to the serving private 5G network, a security profile of the user device that is received from the home private 5G network; and
   facilitating onboarding of the user device to the serving private 5G network with the security profile.

2. The method of claim 1, further comprising:
   prior to onboarding of the user device to the serving private 5G network, comparing the security profile of the user device against minimum security requirements of the serving private 5G network.

3. The method of claim 1, further comprising:
   determining a level of network accessibility of the user device based on the security profile; and
   transmitting the level of network accessibility to the serving private 5G network.

4. The method of claim 1, further comprising:
   receiving, from the home private 5G network, performance records of the user device that are collected while the user device is connected to the home private 5G network; and
   determining a trust score of the user device based on the security profile and the performance records to transmit to the serving private 5G network.

5. The method of claim 1, further comprising:
   receiving, from the serving private 5G network, information associated with policy compliance of the user device within the serving private 5G network.

6. The method of claim 1, wherein the message broadcasted is a System Information Block (SIB) message.

7. The method of claim 1, wherein the security profile defines provisioning information and a security state of the user device.

8. A system comprising:
   one or more processors; and
   a computer-readable medium comprising instructions stored therein, which when executed by the one or more processors, cause the one or more processors to:
      receive a request from a user device for registration with a serving private 5G network, wherein the serving private 5G network is part of a private 5G federation system and the request from the user device received upon broadcasting of a message by an access point of the serving private 5G network indicating that the serving private 5G network is part of the private 5G federation system;
      determine that the user device is authenticated with a home private 5G network of the user device, wherein the home private 5G network is part of the private 5G federation system;
      in response to determining that the user device is authenticated with the home private 5G network, transmit, to the serving private 5G network, a security profile of the user device that is received from the home private 5G network; and facilitate onboarding of the user device to the serving private 5G network with the security profile.

9. The system of claim 8, wherein the instructions, which when executed by the one or more processors, further cause the one or more processors to:
prior to onboarding of the user device to the serving private 5G network, compare the security profile of the user device against minimum security requirements of the serving private 5G network.

10. The system of claim 8, wherein the instructions, which when executed by the one or more processors, further cause the one or more processors to:
determine a level of network accessibility of the user device based on the security profile; and
transmit the level of network accessibility to the serving private 5G network.

11. The system of claim 8, wherein the instructions, which when executed by the one or more processors, further cause the one or more processors to:
receive, from the home private 5G network, performance records of the user device that are collected while the user device is connected to the home private 5G network; and
determine a trust score of the user device based on the security profile and the performance records to transmit to the serving private 5G network.

12. The system of claim 8, wherein the instructions, which when executed by the one or more processors, further cause the one or more processors to:
receive, from the serving private 5G network, information associated with policy compliance of the user device within the serving private 5G network.

13. The system of claim 8, wherein the message broadcasted is a System Information Block (SIB) message.

14. The system of claim 8, wherein the security profile defines provisioning information and a security state of the user device.

15. One or more non-transitory computer-readable media comprising computer-readable instructions, which when executed by one or more processors of a computing system, cause the computing system to:
receive a request from a user device for registration with a serving private 5G network, wherein the serving private 5G network is part of a private 5G federation system and the request from the user device received upon broadcasting of a message by an access point of the serving private 5G network indicating that the serving private 5G network is part of the private 5G federation system;
determine that the user device is authenticated with a home private 5G network of the user device, wherein the home private 5G network is part of the private 5G federation system;
in response to determining that the user device is authenticated with the home private 5G network, transmit, to the serving private 5G network, a security profile of the user device that is received from the home private 5G network; and
facilitate onboarding of the user device to the serving private 5G network with the security profile.

16. The one or more non-transitory computer-readable media of claim 15, wherein the instructions, which when executed by the computing system, further cause the computing system to:
prior to onboarding of the user device to the serving private 5G network, compare the security profile of the user device against minimum security requirements of the serving private 5G network.

17. The one or more non-transitory computer-readable media of claim 15, wherein the instructions, which when executed by the computing system, further cause the computing system to:
determine a level of network accessibility of the user device based on the security profile; and
transmit the level of network accessibility to the serving private 5G network.

18. The one or more non-transitory computer-readable media of claim 15, wherein the instructions, which when executed by the computing system, further cause the computing system to:
receive, from the home private 5G network, performance records of the user device that are collected while the user device is connected to the home private 5G network; and
determine a trust score of the user device based on the security profile and the performance records to transmit to the serving private 5G network.

19. The one or more non-transitory computer-readable media of claim 15, wherein the instructions, which when executed by the computing system, further cause the computing system to:
receive, from the serving private 5G network, information associated with policy compliance of the user device within the serving private 5G network.

20. The one or more non-transitory computer-readable media of claim 15, wherein the message broadcasted is a System Information Block (SIB) message.

* * * * *